United States Patent [19]

Morooka

[11] Patent Number: 5,495,367

[45] Date of Patent: Feb. 27, 1996

[54] VARI-FOCAL VIEWFINDER OPTICAL SYSTEM

[75] Inventor: Masaru Morooka, Tokyo, Japan

[73] Assignee: Olympus Optical Co., Ltd., Tokyo, Japan

[21] Appl. No.: 141,730

[22] Filed: Oct. 27, 1993

[30] Foreign Application Priority Data

Oct. 28, 1992 [JP] Japan .................................. 4-311152

[51] Int. Cl.$^6$ .......................... G02B 15/04; G03B 13/10
[52] U.S. Cl. ............................................ 359/674; 354/222
[58] Field of Search .................................. 359/646, 674; 354/222, 219, 224, 225

[56] References Cited

U.S. PATENT DOCUMENTS

| 4,715,692 | 12/1987 | Yamada et al. | 359/674 |
| 4,909,614 | 3/1990 | Itoh et al. | 354/222 |
| 5,055,868 | 10/1991 | Itoh et al. | 354/222 |

FOREIGN PATENT DOCUMENTS

| 1129224 | 5/1989 | Japan . |
| 1129225 | 5/1989 | Japan . |
| 2158707 | 6/1990 | Japan . |

Primary Examiner—Scott J. Sugarman
Attorney, Agent, or Firm—Cushman, Darby & Cushman

[57] ABSTRACT

A vari-focal viewfinder optical system which comprises an objective lens system for forming an image of an object to be photographed, reflecting members for erecting the image formed by the objective lens system, an eyepiece lens component for allowing observation of the image formed by the objective lens system, and a lens component which has a positive refractive power and is disposed so as to be settable and removable into and out of an optical path between the reflecting members and the eyepiece lens component, and is configured so as to change observing visual fields by varying a focal length of the eyepiece lens component by using the lens component which has the positive refractive power and is settable and removable into and out of the optical path. This vari-focal viewfinder optical system permits observing images with no strange impression and makes it possible to configure cameras compact.

3 Claims, 14 Drawing Sheets

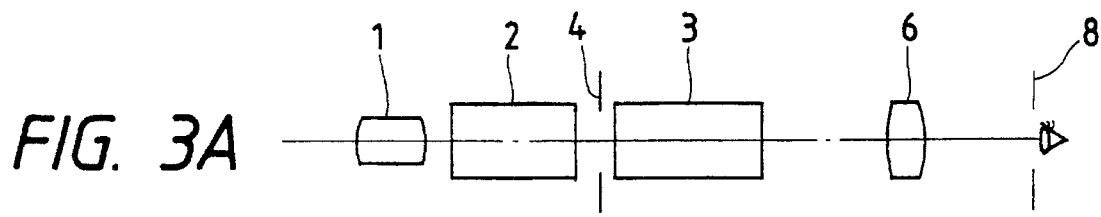
FIG. 3A
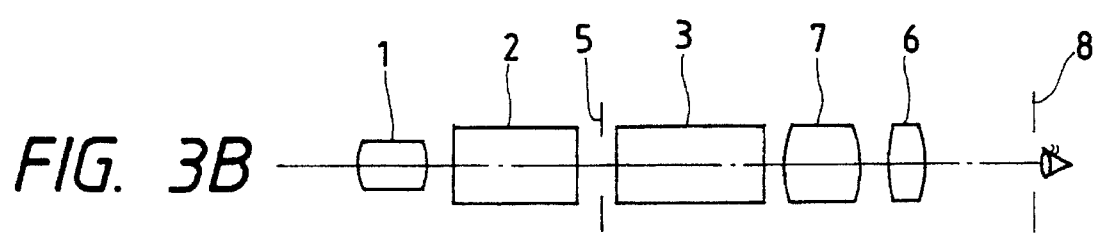
FIG. 3B
FIG. 5A        FIG. 5B
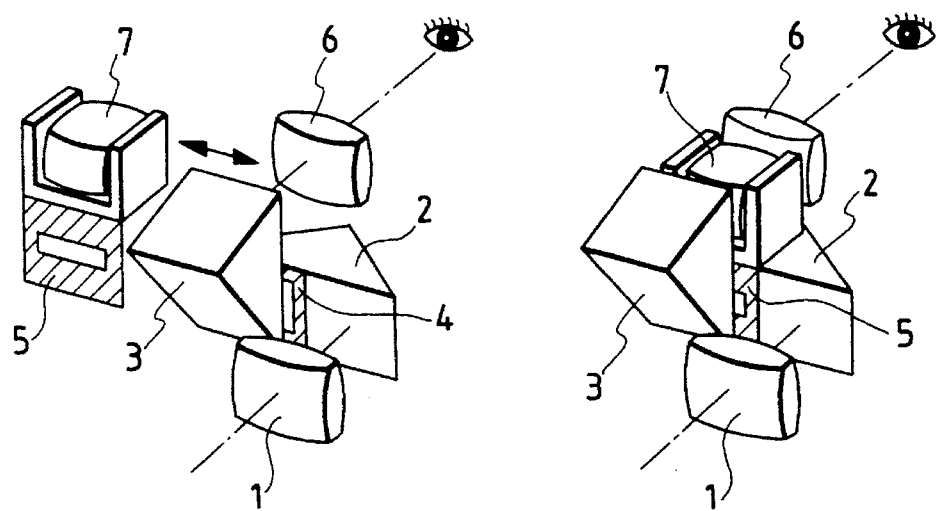

SPHERICAL ABERRATION
DIAMETER OF PUPIL 2.0mm

ASTIGMATISM $\omega\ 33.55°$

DISTORTION

SPHERICAL ABERRATION
DIAMETER OF PUPIL 2.0mm

ASTIGMATISM $\omega\ 22.06°$

DISTORTION

FIG. 14A
SPHERICAL ABERRATION
DIAMETER OF PUPIL 2.0mm
FIG. 14B
ASTIGMATISM
ω 14.12°
FIG. 14C
DISTORTION
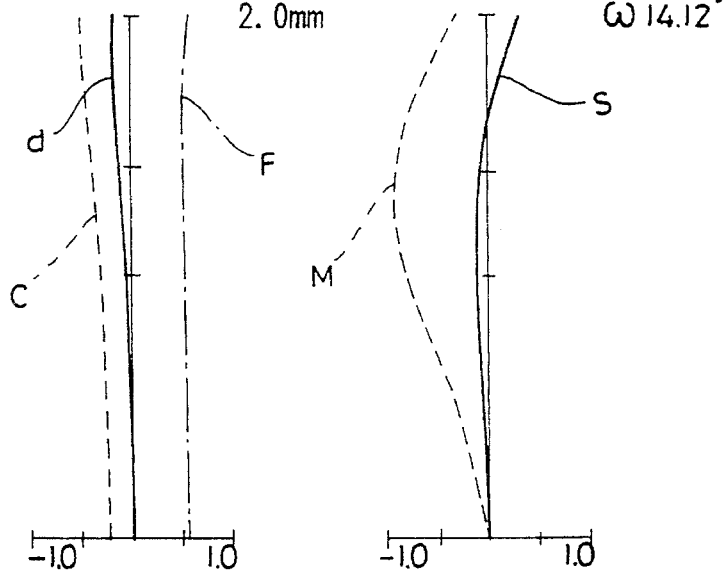
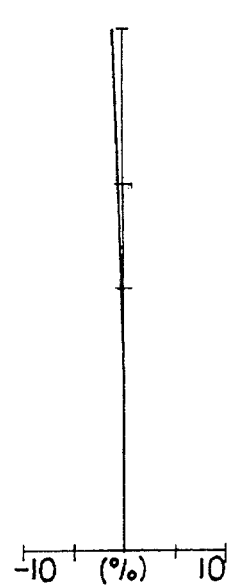
FIG. 15A
SPHERICAL ABERRATION
DIAMETER OF PUPIL 2.0mm
FIG. 15B
ASTIGMATISM
ω 30.86°
FIG. 15C
DISTORTION
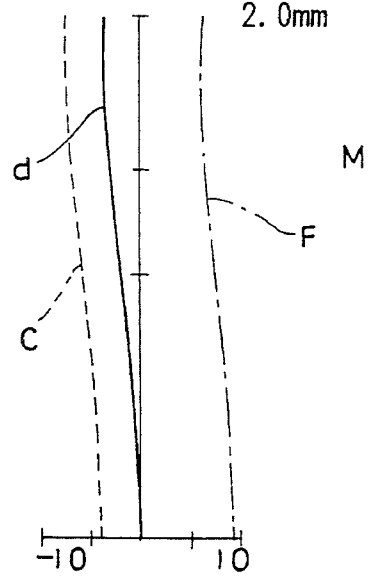
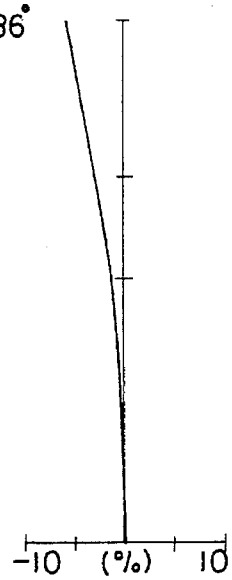

SPHERICAL ABERRATION

ASTIGMATISM

DISTORTION

SPHERICAL ABERRATION

ASTIGMATISM

DISTORTION

SPHERICAL ABERRATION
DIAMETER OF PUPIL 2.0mm

ASTIGMATISM

ω 26.44°

DISTORTION

SPHERICAL ABERRATION
DIAMETER OF PUPIL 2.0mm

ASTIGMATISM

ω 20.57°

DISTORTION

SPHERICAL ABERRATION
DIAMETER OF PUPIL 2.0mm

ASTIGMATISM

ω15.87°

DISTORTION

SPHERICAL ABERRATION
DIAMETER OF PUPIL 2.0mm

ASTIGMATISM

ω24.14°

DISTORTION

SPHERICAL ABERRATION
DIAMETER OF PUPIL 2.0mm

ASTIGMATISM

DISTORTION

SPHERICAL ABERRATION
DIAMETER OF PUPIL 2.0mm

ASTIGMATISM

DISTORTION

SPHERICAL ABERRATION
DIAMETER OF PUPIL 2.0mm

ASTIGMATISM

ω 26.17°

DISTORTION

SPHERICAL ABERRATION
DIAMETER OF PUPIL 2.0mm

ASTIGMATISM

ω 23.07°

DISTORTION

5,495,367

VARI-FOCAL VIEWFINDER OPTICAL SYSTEM

BACKGROUND OF THE INVENTION a) Field of the Invention

The present invention relates to a vari-focal viewfinder optical system for use with cameras capable of changing photographing range into different photographing range by switching regions of films on which images are to be photographed, and more specifically to a vari-focal viewfinder optical system capable of changing a magnification thereof in conjunction with the changes of the photographing ranges of cameras which comprise photographic lens systems configured separately from viewfinder optical systems and permit photographing in a panoramic mode.

b) Description of the Prior Art

In the recent years, it is generally practised, by using cameras designed for use with films having a size of 35 mm, to perform photographing in the panoramic mode for emphasizing wide impressions or obtaining horizontally elongated photographing regions on films by trimming the photographing ranges with shielding plates which are disposed in the vicinities of surfaces of the films so as to cover upper and lower portions thereof.

However, each of the conventional viewfinder optical systems for use with cameras permitting photographing in the panoramic mode uses a visual field frame for displaying a photographing range in an ordinary mode and another visual field frame for displaying a different photographing range in the panoramic mode at the same time. In other words, the conventional viewfinder optical system uses a visual field frame 10 for displaying the photographing range in the ordinary mode and another visual field frame 11 (or marks indicating a visual field frame for displaying the photographing range in the panoramic mode) engraved within the visual field frame for the ordinary photographing mode.

Since the visual field frame for the panoramic mode is overlapped with an image to be photographed in the ordinary mode, the visual field frame for the panoramic mode hinders observation of the image to be photographed in the ordinary mode and portions outside the photographing range are visible in the panoramic mode, whereby the conventional viewfinder optical system has a defect that the optical system makes it rather difficult to correctly guess impressions of actually photographed images. In order to correct these defects of the conventional viewfinder optical systems, it is possible to adopt a method by which only the photographing range for the panoramic mode can be observable by varying the visual field frame for the ordinary mode so as to have a shortened vertical size as illustrated in FIG. 2A and FIG. 2B. However, this method narrows an area to be occupied by the visual field frame within the visual field frame for the ordinary mode of the viewfinder optical system, thereby giving an impression to photographers that the visual field for the panoramic mode is too narrow as compared with that for the ordinary mode.

As a conventional example of viewfinder optical systems which are free from the strange impression described above, there is known a viewfinder optical system disclosed by Japanese Patent Kokai Publication No. Hei 1-129,225. This viewfinder optical system is configured so as to permit enhancing a magnification thereof and enlarging a portion of a visual field thereof by changing a focal length of an eyepiece lens component of the viewfinder optical system, thereby facilitating to obtain the trimming effect within the visual field of the viewfinder optical system.

However, both the examples of the conventional viewfinder optical systems allow aberrations before changes of magnifications of eyepiece lens components of the viewfinder optical system to be remarkably varied from those after the changes of the magnifications, and exhibit remarkably degraded optical performance after the changes of the magnifications. Further, both the examples of the conventional viewfinder optical systems adopt the eyepiece lens component which are configured as vari-focal lens components and therefore have another defect that the viewfinder optical systems are complicated in mechanical structures thereof.

Furthermore, as a still another example of conventional viewfinder optical systems which permit enhancing observing magnifications by enhancing magnifications of viewfinder optical systems with a converter lens component interposed before eyepiece lens components of secondary image formation type of viewfinder optical systems so as to change focal lengths of the eyepiece lens components, there is known a viewfinder optical system proposed by Japanese Patent Kokai Publication No. Hei 2-158,707. However, this conventional example is of the secondary image formation type (a viewfinder optical system of a type configured so as to perform reimaging of an image formed by an objective lens system and allow this image to be observed through an eyepiece lens component) which has a composition hardly permitting shortening a total length of the viewfinder optical system and is undesirable for use in compact cameras.

In addition, a viewfinder optical system proposed by the inventor as Japanese Patent Application No. Hei 4-84,136 is of a primary image formation type (a viewfinder optical system of a type configured so as to allow observation of an image formed by an objective lens system) which permits enhancing an observing magnification by changing a focal length of an eyepiece lens component with a lens component which can be disposed and removed into and out of an optical path of the eyepiece lens component. However, this viewfinder optical system requires a lens component which is to be moved along an optical axis in the eyepiece lens component for minimizing variations of aberrations and favorable adjustment of diopter before and after a magnification change of the eyepiece lens component, thereby being complicated in mechanical structure thereof.

SUMMARY OF THE INVENTION

A primary object of the present invention is to provide a viewfinder optical system which is capable of switching visual field frames between an ordinary photographing mode and a panoramic photographing mode of cameras permitting photographing in the ordinary mode and the panoramic mode, allows little variations of aberrations and diopter before and after changes of magnifications of the viewfinder optical system by switching visual field frames between the ordinary photographing mode and the panoramic photographing mode, and is advantageous for obtaining compact cameras.

The vari-focal viewfinder optical system according to the present invention is of a real image type which consists of an objective lens system for forming an image of an object to be photographed, reflecting members for erecting the image formed by the objective lens system and an eyepiece lens component for allowing observation of the image formed by the objective lens system, and is configured so as to permit changing a size of an observing visual field thereof by changing a magnification of the eyepiece lens component with a lens component having a positive refractive power which can be interposed between the reflecting members and the eyepiece lens component. The eyepiece lens component itself is not moved for changing the magnification thereof.

FIG. 3A shows a sectional view illustrating a composition of the viewfinder optical system according to the present invention when it is set in the ordinary photographing mode, whereas FIG. 3B shows a sectional view visualizing a composition of the viewfinder optical system when it is set in the panoramic photographing mode. In these drawings, the reference numeral 1 represents an objective lens system, the reference numerals 2 and 3 designate reflecting members for erecting an image formed by the objective lens system, the reference numerals 4 and 5 denote visual field frames which are disposed in the vicinities of the image formed by the objective lens system for displaying photographing ranges of visual fields, the reference numeral 6 represents an eyepiece lens component for allowing observation of the image formed by the objective lens system, the reference numeral 7 designates a lens component having a positive refractive power which is to be set and removed into and out of an optical path, and the reference numeral 8 denotes an eye point. The visual field frame 4 is to be used in the ordinary photographing mode, whereas the visual field frame 5 is to be adopted in the panoramic photographing mode and has a vertical size which is smaller than that of the visual field frame 4.

The viewfinder optical system according to the present invention has a composition which is switchable from a condition for the ordinary photographing mode shown in FIG. 3A to another condition for the panoramic photographing mode illustrated in FIG. 3B, and is configured so as to exchange the visual field frame 4 with the visual field frame 5 and interpose the lens component 7 between the reflecting member 3 and the eyepiece lens component 6. When the lens component 7 is interposed between the reflecting member 3 and the eyepiece lens component 6 for use in combination with the eyepiece lens component 7, it has a stronger refractive power as a total sum, thereby enhancing a magnification of the viewfinder optical system, and magnifying an image of the visual field frame 5 for the panoramic photographing mode and the observing visual field so that the visual field frame 5 for the panoramic photographing mode will not give a narrowed impression. This effect will be understood from FIG. 4A illustrating the visual field in the ordinary photographing mode and FIG. 4B showing the visual field in the panoramic photographing mode.

The switching of the visual fields can be performed by exchanging the visual field frame 4 for the ordinary photographing mode with that for the panoramic photographing mode, interposing shielding plates so as to cover upper and lower portions of the visual field frame 4 for the ordinary photographing mode, using a liquid crystal cell or a polarizer, or employing any other equivalent means. The switching of the visual fields can be performed more easily by disposing the visual field frame 4 for the ordinary photographing mode between the reflecting members 2 and 3 for erecting the image (for example, on a surface of emergence of the reflecting member 2 which is a prism), and fixing the visual field frame 5 on a frame of the lens component 7 which is settable and removable into and out of the optical path so that the visual field frame 5 for the panoramic photographing mode is set and removed into and out the optical path in conjunction with the setting and removing of the lens component 7. FIG. 5A shows a condition of the viewfinder optical system according to the present invention when it is set in the ordinary photographing mode, whereas FIG. 5B illustrates another condition of the viewfinder optical system when it is set in the panoramic photographing mode.

The vari-focal viewfinder optical system according to the present invention is configured so as to change the focal length of the eyepiece lens component by setting and removing the lens component 7 having the positive refractive power into and out of the optical path as described above. Owing to the fact that locations of the other lens components are not varied, except for the lens component 7 which is set and removed into and out of the optical path, the vari-focal viewfinder optical system according to the present invention allows observation of images with little variations of aberrations and a small change of diopter between the conditions before and after the change of the magnification of the eyepiece lens component.

In order to minimize the variations of aberrations, etc. after the change of the magnification from those before the change of the magnification, it is desirable that the lens component 7 which has the positive refractive power and is to be set into the optical path satisfies the following condition (1):

$$1 < |(R_f - R_r)/(R_f + R_r)| < 5 \qquad (1)$$

wherein the reference symbols $R_f$ and $R_r$ represent radii of curvature on an object side surface and an observation side surface respectively of the lens components which has the positive refractive power and is to be set and removed into and out of the optical path.

If the upper limit of the condition (1) is exceeded, aberrations after the lens component having the positive refractive power is set into the optical path will be remarkably varied from those before the lens component is set into the optical path in the viewfinder optical system according to the present invention. If the lower limit of the condition (1) is exceeded, diopter after setting the lens component having the positive refractive power will be varied from that before setting the lens component into the optical path, thereby undesirably giving a strange impression to an observer.

By using at least one aspherical surface in the objective lens system and at least one aspherical surface on the eyepiece lens component, it is possible to shorten a total length of the vari-focal viewfinder optical system according to the present invention while favorably correcting aberrations therein, reduce a number of lens components required for composing the viewfinder optical system and configure the viewfinder optical system compact.

BRIEF DESCRIPTION OF THE DRAWINGS

FIG. 3A and FIG. 3B show sectional views illustrating a composition of the vari-focal viewfinder optical system according to the present invention;

FIG. 5A and FIG. 5B show perspective views exemplifying how a lens component and a visual field frame are set and removed into and out of an optical path in the vari-focal viewfinder optical system according to the present invention;

FIG. 14A, FIG. 14B and FIG. 14C show graphs illustrating aberration characteristics at a tele position of the first embodiment of the present invention when it is set in the ordinary photographing mode;

FIG. 15A, FIG. 15B and FIG. 15C show curves visualizing aberration characteristics at the wide position of the first embodiment of the present invention when it is set in the panoramic photographing mode;

DETAILED DESCRIPTION OF THE PREFERRED EMBODIMENTS

Figure 1:
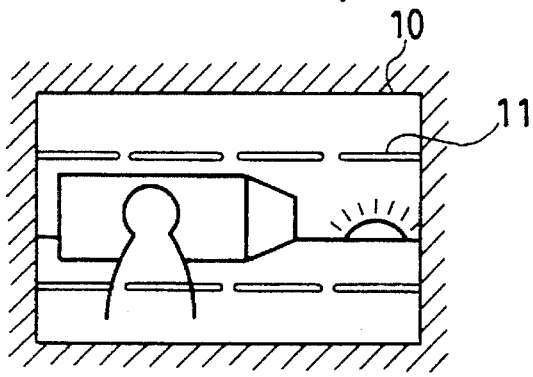
FIG. 1 shows a diagram illustrating a configuration of the visual field frames of a conventional viewfinder optical system.
Figure 2A:
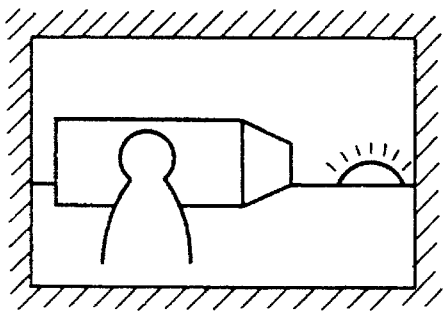
FIG. 2A and FIG. 2B show diagrams illustrating a configuration of visual field frames of another conventional viewfinder optical system.
Figure 2B:
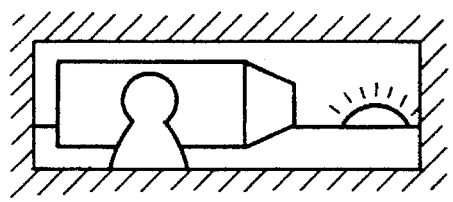
Figure 4A:
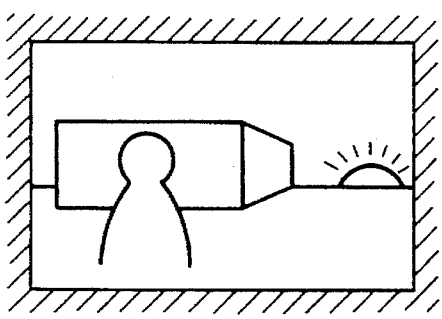
FIG. 4A and FIG. 4B show views illustrating visual field frames to be used in the vari-focal viewfinder optical system according to the present invention.
Figure 4B:
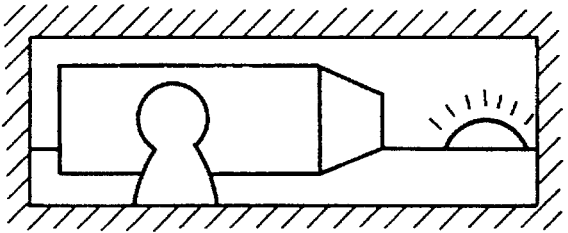

Now, the vari-focal viewfinder optical system according to the present invention will be described more detailedly below with reference to the preferred embodiments thereof illustrated in the accompanying drawings and given in a form of the following numerical data:

Embodiment 1
  (ordinary photographing mode)

---

$r_1 = 20.4672$
   $d_1 = 1.000$   $n_1 = 1.58423$   $v_1 = 30.49$
$r_2 = 4.3097$ (aspherical surface)
   $d_2 = D_1$ (variable)
$r_3 = 6.8967$ (aspherical surface)
   $d_3 = 1.838$   $n_2 = 1.49241$   $v_2 = 57.66$
$r_4 = 10.1910$
   $d_4 = D_2$ (variable)
$r_5 = 9.2564$ (aspherical surface)
   $d_5 = 3.160$   $n_3 = 1.49241$   $v_3 = 57.66$
$r_6 = -9.9812$
   $d_6 = D_3$ (variable)
$r_7 = -40.3676$ (aspherical surface)
   $d_7 = 19.049$   $n_4 = 1.49241$   $v_4 = 57.66$
$r_8 = -11.1181$
   $d_8 = 1.000$
$r_9 = \infty$
   $d_9 = 15.700$   $n_5 = 1.49241$   $v_4 = 57.66$
$r_{10} = \infty$
   $d_{10} = 9.500$
$r_{13} = 15.9091$ (aspherical surface)
   $d_{13} = 3.039$   $n_7 = 1.49241$   $v_7 = 57.66$
$r_{14} = -27.6806$
   $d_{14} = 18.786$
$r_{15} = $ eye point

--- aspherical surface coefficients (2nd surface)
P = 1.0000,   E = $-0.10844 \times 10^{-2}$,   F = $0.50237 \times 10^{-4}$
              G = $-0.93916 \times 10^{-5}$,   H = $0.21804 \times 10^{-6}$
(3rd surface)
P = 1.0000,   E = $0.73203 \times 10^{-4}$,    F = $-0.45235 \times 10^{-4}$
              G = $0.38861 \times 10^{-5}$,    H = $-0.14219 \times 10^{-6}$
(5th surface)
P = 1.0000,   E = $-0.50796 \times 10^{-3}$,   F = $0.37689 \times 10^{-4}$
              G = $-0.35484 \times 10^{-5}$,   H = $0.12772 \times 10^{-6}$
(7th surface)
P = 1.0000,   E = $-0.10077 \times 10^{-2}$,   F = $0.63982 \times 10^{-4}$
              G = $-0.59260 \times 10^{-5}$,   H = $0.15121 \times 10^{-6}$
(13th surface)

-continued

| | | | |
|---|---|---|---|
| P = 1.0000, | E = −0.11430 × 10⁻³, | F = 0.13197 × 10⁻⁵ | |
| | G = −0.33726 × 10⁻⁷, | H = 0.43895 × 10⁻⁹ | |

| | wide position | intermediate focal length | tele position |
|---|---|---|---|
| $D_1$ | 10.4731 | 2.6498 | 2.5293 |
| $D_2$ | 2.5589 | 5.8290 | 0.9866 |
| $D_3$ | 0.8000 | 5.3531 | 10.3162 |
| magnification of viewfinder | 0.33 | 0.54 | 0.87 |
| field angle (2ω) | 67.00 | 44.120 | 28.240 |

(panoramic photographing mode)

$r_1 = 20.4672$
  $d_1 = 1.000$   $n_1 = 1.58423$   $v_1 = 30.49$
$r_2 = 4.3097$ (aspherical surface)
  $d_2 = D_1$ (variable)
$r_3 = 6.8967$ (aspherical surface)
  $d_3 = 1.838$   $n_2 = 1.49241$   $v_2 = 57.66$
$r_4 = 10.1910$
  $d_4 = D_2$ (variable)
$r_5 = 9.2564$ (aspherical surface)
  $d_5 = 3.160$   $n_3 = 1.49241$   $v_3 = 57.66$
$r_6 = -9.9812$
  $d_6 = D_3$ (variable)
$r_7 = -40.3676$ (aspherical surface)
  $d_7 = 19.049$   $n_4 = 1.49241$   $v_4 = 57.66$
$r_8 = -11.1181$
  $d_8 = 1.000$
$r_9 = \infty$
  $d_9 = 15.700$   $n_5 = 1.49241$   $v_5 = 57.66$
$r_{10} = \infty$
  $d_{10} = 1.000$
$r_{11} = 38.0654$
  $d_{11} = 7.200$   $n_6 = 1.49241$   $v_6 = 57.66$
$r_{12} = -502.1515$
  $d_{12} = 1.300$
$r_{13} = 15.9091$ (aspherical surface)
  $d_{13} = 3.039$   $n_7 = 1.49241$   $v_7 = 57.66$
$r_{14} = -27.6806$
  $d_{14} = 17.286$
$r_{15}$ = eye point

| | wide position | intermediate focal length | tele position |
|---|---|---|---|
| magnification of viewfinder | 0.4 | 0.65 | 1.04 |
| field angle (2ω) | 61.71° | 40.11° | 25.52° |
| $\|(R_f - R_r)/(R_f + R_r)\| = 1.16$ | | | |

Embodiment 2

(ordinary photographing mode)

$r_1 = 38.3716$
  $d_1 = 1.000$   $n_1 = 1.58423$   $v_1 = 30.49$
$r_2 = 4.6354$ (aspherical surface)
  $d_2 = D_1$ (variable)
$r_3 = 6.0135$ (aspherical surface)
  $d_3 = 1.930$   $n_2 = 1.49241$   $v_2 = 57.66$
$r_4 = 8.2419$
  $d_4 = D_2$ (variable)
$r_5 = 9.2421$ (aspherical surface)
  $d_5 = 4.170$   $n_3 = 1.49241$   $v_3 = 57.66$
$r_6 = -8.7954$
  $d_6 = D_3$ (variable)
$r_7 = -57.7437$ (aspherical surface)
  $d_7 = 19.117$   $n_4 = 1.49241$   $v_4 = 57.66$
$r_8 = -11.4140$
  $d_8 = 1.000$
$r_9 = \infty$
  $d_9 = 15.700$   $n_5 = 1.49241$   $v_5 = 57.66$
$r_{10} = \infty$
  $d_{10} = 9.464$
$r_{13} = 16.1915$ (aspherical surface)
  $d_{13} = 3.084$   $n_7 = 1.49241$   $v_7 = 57.66$
$r_{14} = -26.8180$
  $d_{14} = 19.0$
$r_{15}$ = eye point aspherical surface coefficients (2nd surface)
P = 1.0000,   E = −0.82278 × 10⁻³,   F = 0.59529 × 10⁻⁴
        G = −0.94173 × 10⁻⁵,   H = 0.35830 × 10⁻⁶
(3rd surface)
P = 1.0000,   E = −0.28665 × 10⁻³,   F = −0.22160 × 10⁻⁴
        G = 0.30713 × 10⁻⁵,   H = −0.18195 × 10⁻⁶
(5th surface)
P = 1.0000,   E = −0.56115 × 10⁻³,   F = 0.27989 × 10⁻⁴
        G = −0.41870 × 10⁻⁵,   H = 0.21742 × 10⁻⁶
(7th surface)
P = 1.0000,   E = −0.72959 × 10⁻³,   F = 0.32376 × 10⁻⁴
        G = −0.44169 × 10⁻⁵,   H = 0.20773 × 10⁻⁶
(13th surface)
P = 1.0000,   E = −0.94239 × 10⁻⁴,   F = 0.11543 × 10⁻⁵
        G = −0.27038 × 10⁻⁷,   H = 0.22540 × 10⁻⁹

| | wide position | intermediate focal length | tele position |
|---|---|---|---|
| $D_1$ | 5.7683 | 2.9547 | 2.7517 |
| $D_2$ | 3.7746 | 3.8586 | 1.2986 |
| $D_3$ | 1.6490 | 4.3790 | 7.1420 |
| magnification of viewfinder | 0.4 | 0.53 | 0.7 |
| field angle (2ω) | 52.89° | 41.15° | 31.73° |

(panoramic photographing mode)

$r_1 = 38.3716$
  $d_1 = 1.000$   $n_1 = 1.58423$   $v_1 = 30.49$
$r_2 = 4.6354$ (aspherical surface)
  $d_2 = D_1$ (variable)
$r_3 = 6.0135$ (aspherical surface)
  $d_3 = 1.930$   $n_2 = 1.49241$   $v_2 = 57.66$
$r_4 = 8.2419$
  $d_4 = D_2$ (variable)
$r_5 = 9.2421$ (aspherical surface)
  $d_5 = 4.170$   $n_3 = 1.49241$   $v_3 = 57.66$
$r_6 = -8.7954$
  $d_6 = D_3$ (variable)
$r_7 = -57.7437$ (aspherical surface)
  $d_7 = 19.117$   $n_4 = 1.49241$   $v_4 = 57.66$
$r_8 = -11.4140$
  $d_8 = 1.000$
$r_9 = \infty$
  $d_9 = 15.700$   $n_5 = 1.49241$   $v_5 = 57.66$
$r_{10} = \infty$
  $d_{10} = 1.000$
$r_{11} = 37.1421$
  $d_{11} = 7.164$   $n_6 = 1.49241$   $v_6 = 57.66$
$r_{12} = -668.8700$
  $d_{12} = 1.300$
$r_{13} = 16.1915$ (aspherical surface)
  $d_{13} = 3.084$   $n_7 = 1.49241$   $v_7 = 57.66$
$r_{14} = -26.8180$
  $d_{14} = 17.585$
$r_{15}$ = eye point

| | wide position | intermediate focal length | tele position |
|---|---|---|---|
| magnification of viewfinder | 0.48 | 0.64 | 0.84 |
| field angle (2ω) | 48.27° | 37.36° | 28.71° |
| $\|(R_f - R_r)/(R_f + R_r)\| = 1.12$ | | | |

Embodiment 3

(ordinary photographing mode)

$r_1 = -2.4170$
  $d_1 = 1.916$   $n_1 = 1.49241$   $v_1 = 57.66$
$r_2 = -2.1310$ (aspherical surface)

-continued $d_2 = 0.764$
$r_3 = -6.5192$ (aspherical surface)
$d_3 = 1.000$    $n_2 = 1.58423$    $v_2 = 30.49$
$r_4 = -12.2346$
$d_4 = 0.936$
$r_5 = 7.6601$
$d_5 = 15.430$   $n_3 = 1.49241$    $v_3 = 57.66$
$r_6 = \infty$
$d_6 = 1.000$
$r_7 = 9.6155$
$d_7 = 16.000$   $n_4 = 1.49241$    $v_4 = 57.66$
$r_8 = \infty$
$d_8 = 10.776$
$r_{11} = 17.7094$ (aspherical surface)
$d_{11} = 2.751$  $n_6 = 1.49241$   $v_6 = 57.66$
$r_{12} = -31.7125$
$d_{12} = 16.500$
$r_{13}$ = eye point aspherical surface coefficients (2nd surface)
$P = 1.0000$,    $E = 0.16505 \times 10^{-1}$,    $F = 0.14062 \times 10^{-2}$
            $G = -0.46386 \times 10^{-3}$,  $H = 0.16106 \times 10^{-3}$
(3rd surface)
$P = 1.0000$,    $E = 0.76627 \times 10^{-2}$,    $F = 0.15372 \times 10^{-3}$
            $G = -0.36238 \times 10^{-3}$,  $H = 0.44996 \times 10^{-4}$
(11th surface)
$P = 1.0000$,    $E = -0.34923 \times 10^{-4}$,   $F = -0.24437 \times 10^{-5}$
            $G = 0.94459 \times 10^{-7}$,   $H = -0.10559 \times 10^{-8}$

|  | wide position |
|---|---|
| magnification of viewfinder | 0.4 |
| field angle (2ω) | 52.34° |

(panoramic photographing mode)

$r_1 = -2.4170$
$d_1 = 1.916$    $n_1 = 1.49241$    $v_1 = 57.66$
$r_2 = -2.1310$ (aspherical surface)
$d_2 = 0.764$
$r_3 = -6.5192$ (aspherical surface)
$d_3 = 1.000$    $n_2 = 1.58423$    $v_2 = 30.49$
$r_4 = -12.2346$
$d_4 = 0.936$
$r_5 = 7.6601$
$d_5 = 15.430$   $n_3 = 1.49241$    $v_3 = 57.66$
$r_6 = \infty$
$d_6 = 1.000$
$r_7 = 9.6155$
$d_7 = 16.000$   $n_4 = 1.49241$    $v_4 = 57.66$
$r_8 = \infty$
$d_8 = 1.000$
$r_9 = 51.1590$
$d_9 = 8.776$    $n_5 = 1.49241$    $v_5 = 57.66$
$r_{10} = -202.0335$
$d_{10} = 1.000$
$r_{11} = 17.7094$ (aspherical surface)
$d_{11} = 2.751$  $n_6 = 1.49241$   $v_6 = 57.66$
$r_{12} = -31.7125$
$d_{12} = 15.000$
$r_{13}$ = eye point

|  | wide position |
|---|---|
| magnification of viewfinder | 0.48 |
| field angle (2ω) | 46.13° |
| $\|(R_f - R_r)/(R_f + R_r)\| = 1.68$ | | wherein the reference symbols $r_1, r_2, \ldots$ represent radii of curvature on surfaces of respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, and the reference symbols $v_1, v_2, \ldots$ represent Abbe's numbers of the respective lens components.

Figure 6A:
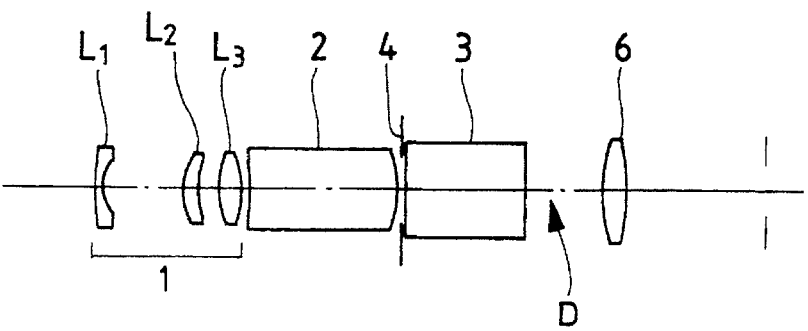
FIG. 6A, FIG. 6B and FIG. 6C show sectional views illustrating a composition of a first embodiment of the vari-focal viewfinder optical system according to the present invention when it is set in the ordinary photographing mode.
Figure 6B:
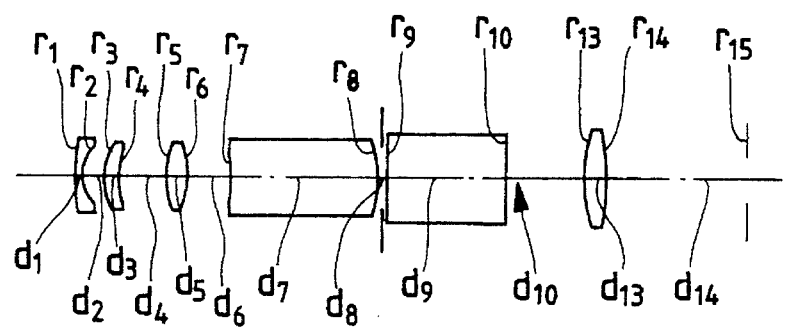
Figure 6C:
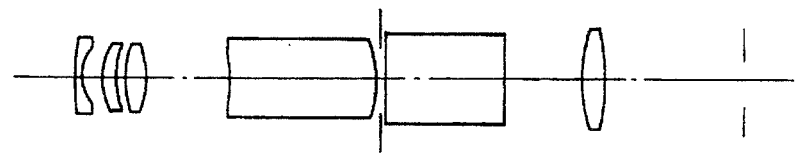
Figure 7A:
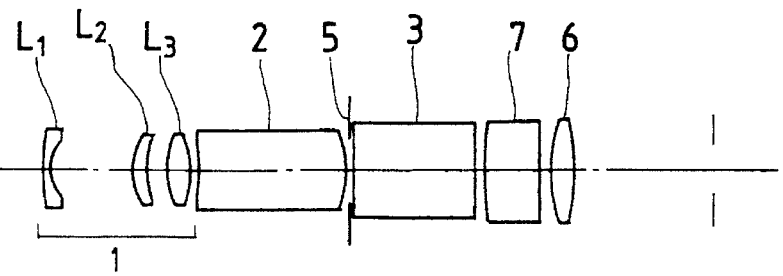
FIG. 7A, FIG. 7B and FIG. 7C show sectional views illustrating the composition of the first embodiment of the present invention when it is set in the panoramic photographing mode.
Figure 7B:
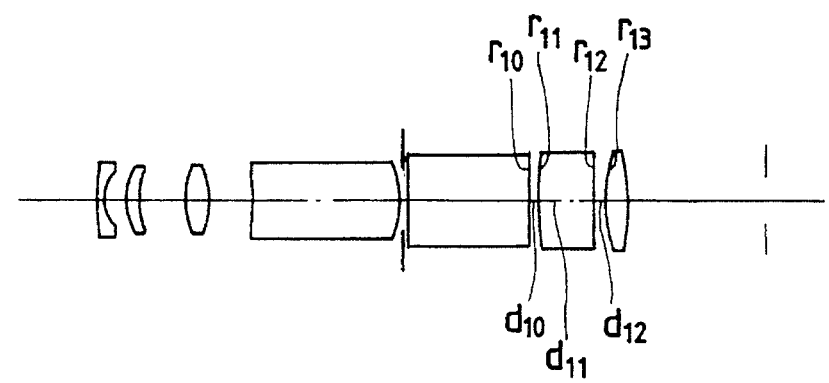
Figure 7C:
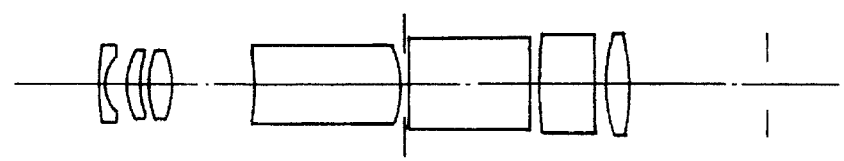

The first embodiment of the vari-focal viewfinder optical system according to the present invention has the composition illustrated in FIGS. 6A, 6B, 6C, 7A, 7B and 7C. Out of these drawings, FIGS. 6A, 6B and 6C illustrate the composition of the first embodiment of the present invention in a condition where it is set in the ordinary photographing mode, whereas FIGS. 7A, 7B and 7C show the composition of the first embodiment in another condition where it is set in the panoramic photographing mode. FIG. 6A and FIG. 7A show the composition of the first embodiment at the wide position thereof, FIG. 6B and FIG. 7B illustrate the composition of the first embodiment at the intermediate focal length thereof, and FIG. 6C and FIG. 7C visualize the composition of the first embodiment at the tele position thereof.

The first embodiment of the vari-focal viewfinder optical system according to the present invention comprises an objective lens system 1 which consists of a lens component $L_1$, a lens component $L_2$ and a lens component $L_3$, and is configured so as to change a magnification thereof by moving the lens components $L_2$ and $L_3$ while keeping the lens component $L_1$ stationary. The reference numerals 2 and 3 represent reflecting members each of which is composed of a prism functioning for erecting an image formed by the objective lens system. The reference numeral 4 designates a visual field frame to be employed for the ordinary photographing mode and the reference numeral 6 denotes an eyepiece lens component composed of a single lens element. Further, a lens component 7 shown in FIGS. 7A, 7B and 7C is a positive lens component which can be set and removed into and out of an optical path. This positive lens component is removed out of the vari-focal viewfinder optical system shown in FIGS. 6A, 6B and 6C. The reference numeral 5 represents a visual field frame to be adopted for the panoramic photographing mode.

A magnification of the first embodiment of the varifocal viewfinder optical system according to the present invention is changed by moving the lens components $L_2$ and $L_3$ of the objective lens system 1 in the ordinary photographing mode illustrated in FIGS. 6A, 6B and 6C. For observing an image in the panoramic photographing mode, the visual field frames are exchanged and the lens component 7 is set in the optical path as illustrated in FIGS. 7A, 7B and 7C. In this photographing mode, the magnification of the vari-focal viewfinder optical system is changed by moving the lens components $L_2$ and $L_3$ of the objective lens system 1 as illustrated in FIGS. 7A, 7B and 7C.

In the numerical data of the first embodiment of the present invention which are listed above, the ordinary photographing mode is described in a form of values of parameters, surfaces $r_1$ through $r_6$ correspond to the objective lens system 1, surfaces $r_9$ and $r_{10}$ represent the prisms 2 and 3 respectively which are used as the reflecting members, and surfaces $r_{13}$ and $r_{14}$ designate the eyepiece lens component 6. In the panoramic photographing mode in which the lens component 7 (having surfaces $r_{11}$ and $r_{12}$) is set in an airspace D, the first embodiment has the numerical data which include $r_{11}$ and $r_{12}$ between $r_{10}$ and $r_{13}$. The other items of the numerical data are common to both the ordinary photographing mode and the panoramic photographing mode.

At the wide position, intermediate focal length and tele position in the ordinary photographing mode, the first embodiment of the present invention has the aberration characteristics illustrated in FIGS. 12A–12C, FIGS. 13A–13C and FIGS. 14A–14C respectively. At the wide position, intermediate focal length and tele position in the panoramic photographing mode, the first embodiment has the aberration characteristics illustrated in FIGS. 15A–15C, FIGS. 16A–16C and FIGS. 17A–17C respectively.

Figure 8A:
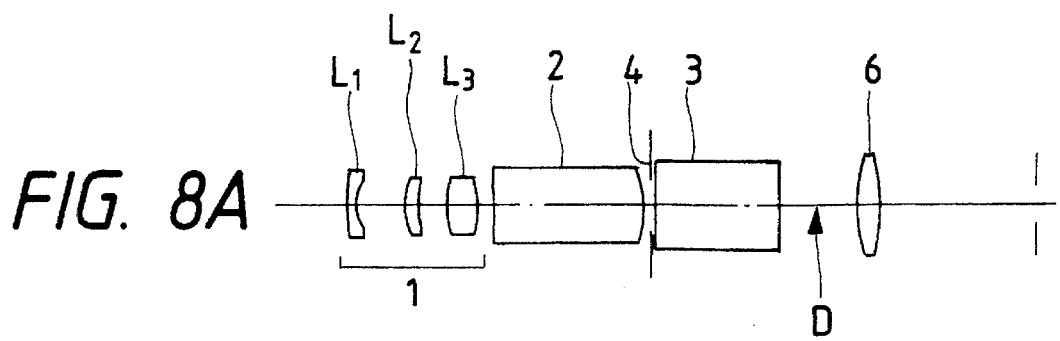
FIG. 8A, Fig, 8B and FIG. 8C show sectional views illustrating a composition of a second embodiment of the vari-focal viewfinder optical system according to the present invention when it is set in the ordinary photographing mode.
Figure 8B:
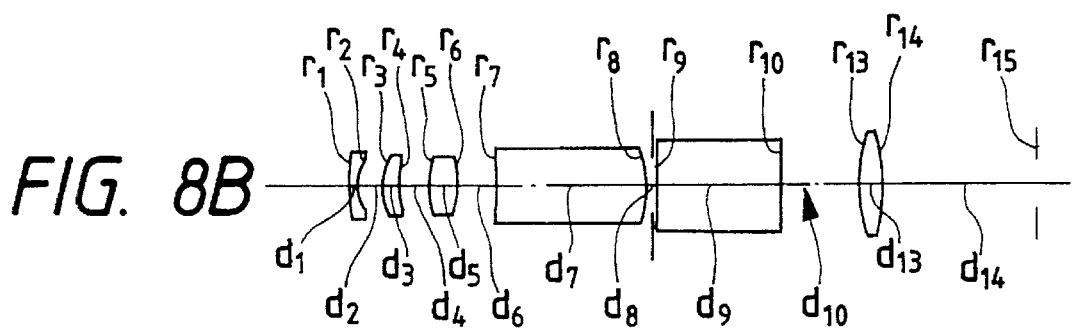
Figure 8C:
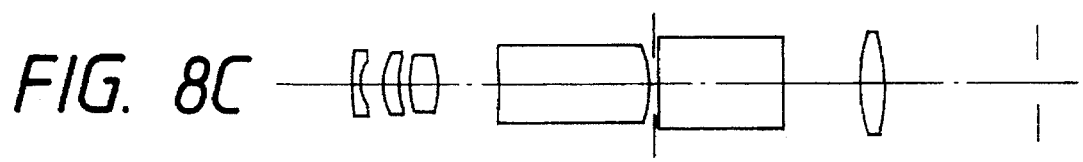
Figure 9A:
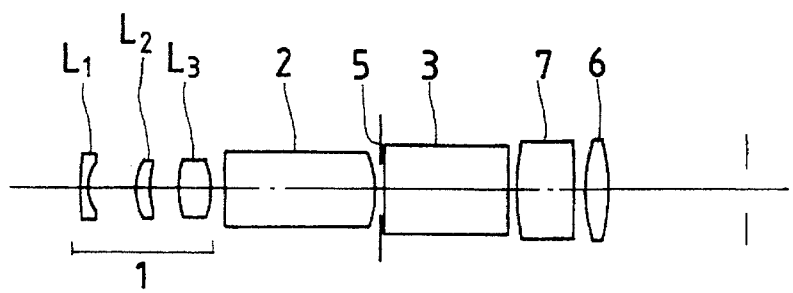
FIG. 9A, FIG. 9B and FIG. 9C show sectional views illustrating the composition of the second embodiment of the present invention when it is set in the panoramic photographing mode.
Figure 9B:
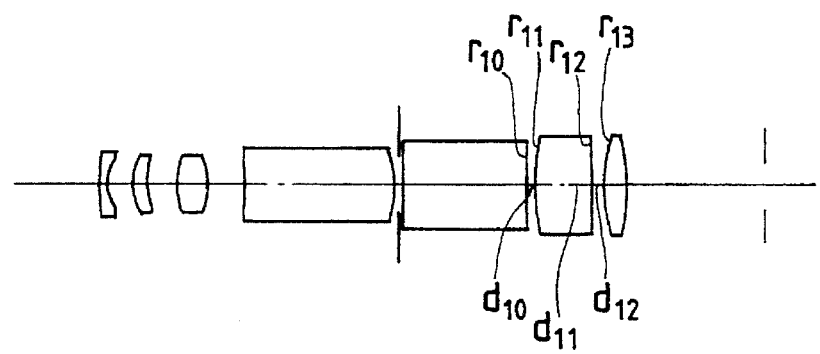
Figure 9C:
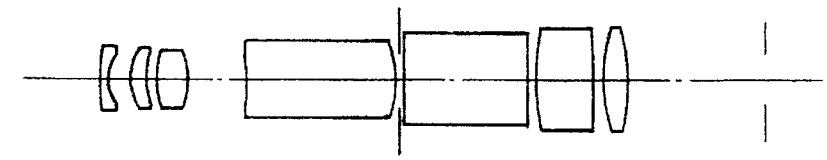

The second embodiment of the vari-focal viewfinder optical system according to the present invention has the composition illustrated in FIGS. 9A, 9B and 9C in the ordinary photographing mode thereof or the composition shown in FIGS. 9A, 9B and 9C in the panoramic photographing mode thereof. When the second embodiment of the present invention is set in the panoramic photographing mode thereof, a lens component 7 is set into the optical system and a visual field frame 4 is exchanged with another visual field frame 5 as in the case of the first embodiment of the present invention. The second embodiment comprises an objective lens system 1 which consists of lens components $L_1$, $L_2$ and $L_3$ like that of the first embodiment, and is configured so as to change a magnification thereof by moving the lens components $L_2$ and $L_3$ while keeping the lens component $L_1$ stationary as illustrated in FIGS. 8A, 9A (the wide position), FIGS. 8B, 9B (the intermediate focal length) and FIGS. 8C and 9C (the tele position).

The second embodiment of the present invention described above has the numerical data which are listed in the same manner as those of the first embodiment. At the wide position, the intermediate focal length and the tele position in the ordinary photographing mode, the second embodiment of the present invention has the aberration characteristics illustrated in FIG. 18A–18C, FIGS. 19A–19C and FIGS. 20A–20C respectively, whereas those at the wide position, the intermediate focal length and the tele position of the second embodiment in the panoramic photographing mode thereof are visualized in FIGS. 21A–21C, FIGS. 22A–22C and FIGS. 23A–23C respectively.

Figure 10:
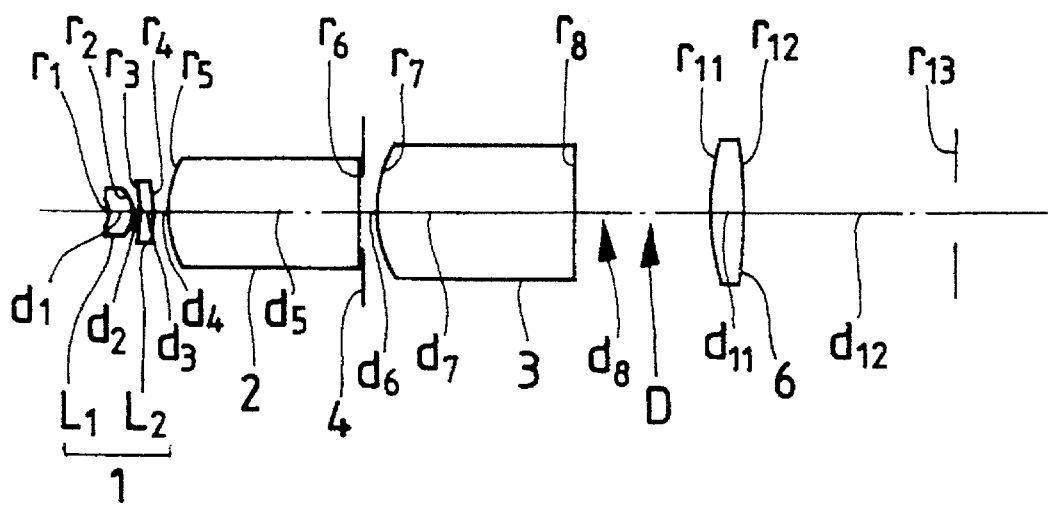
FIG. 10 shows a sectional view illustrating a composition of a third embodiment of the vari-focal viewfinder optical system according to the present invention when it is set in the ordinary photographing mode.
Figure 11:
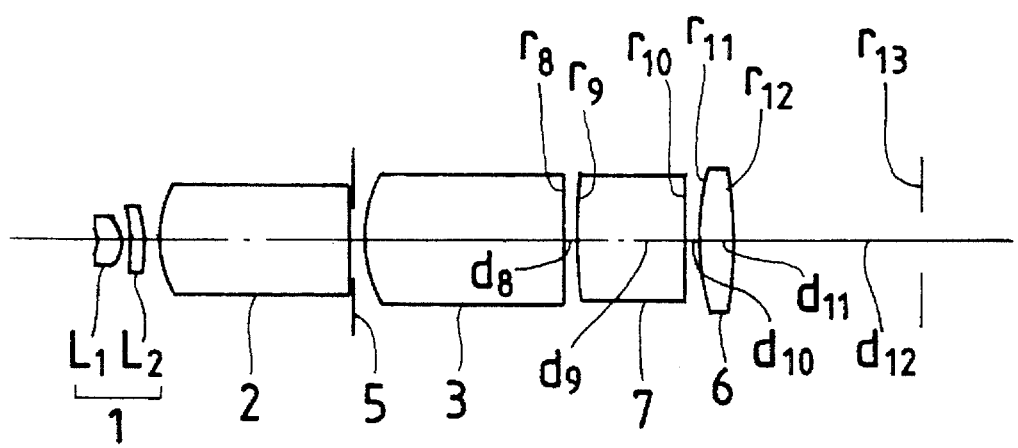
FIG. 11 shows a sectional view illustrating the composition of the third embodiment of the present invention when it is set in the panoramic photographing mode.
Figure 12A:
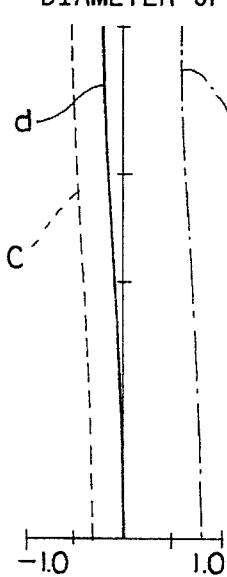
FIG. 12A, FIG. 12B and FIG. 12C show graphs illustrating aberration characteristics at a wide position of the first embodiment of the present invention when it is set in the ordinary photographing mode.
Figure 12B:
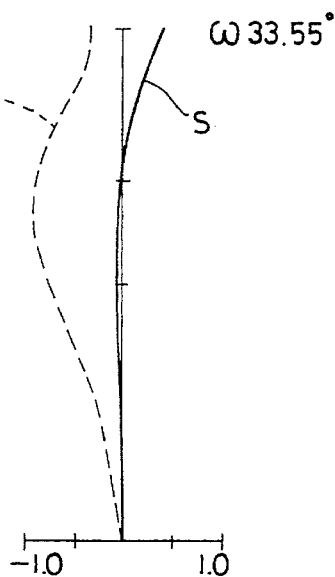
Figure 12C:
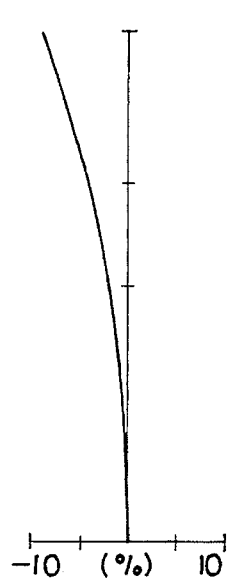
Figure 13A:
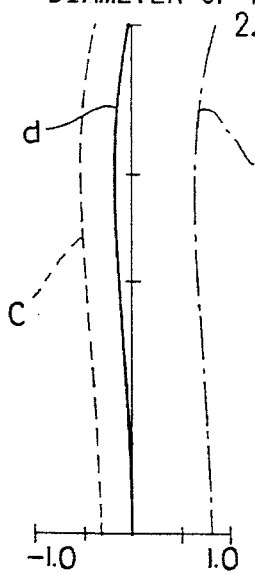
FIG. 13A, FIG. 13B and FIG. 13C show graphs illustrating aberration characteristics at an intermediate focal length of the first embodiment of the present invention when it is set in the ordinary photographing mode.
Figure 13B:
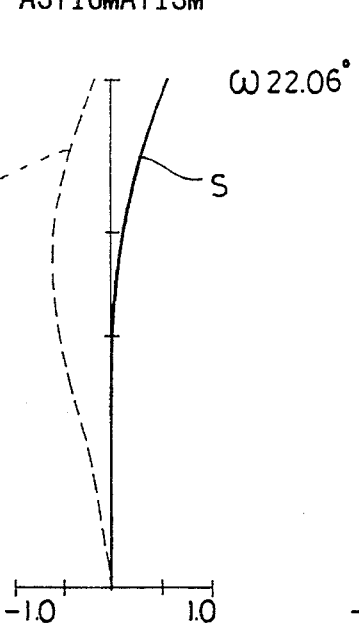
Figure 13C:
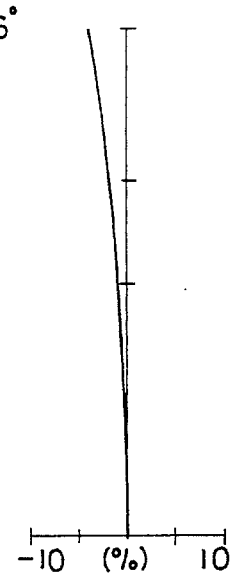
Figure 16A:
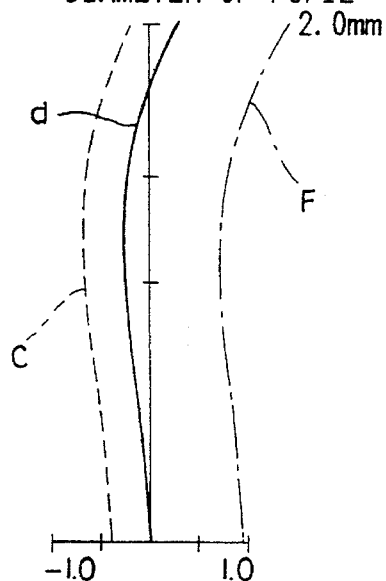
FIG. 16A, FIG. 16B and FIG. 16C show curves visualizing aberration characteristics at the intermediate focal length of the first embodiment of the present invention when it is set in the panoramic photographing mode.
Figure 16B:
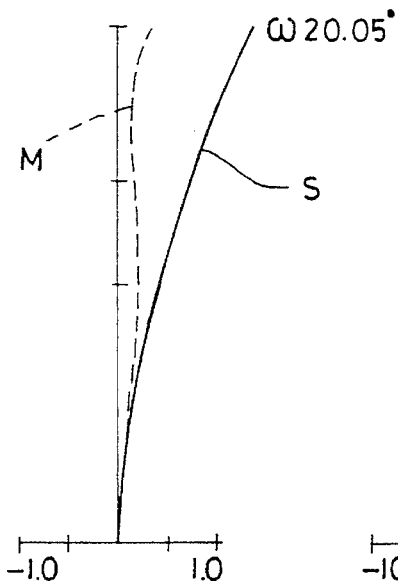
Figure 16C:
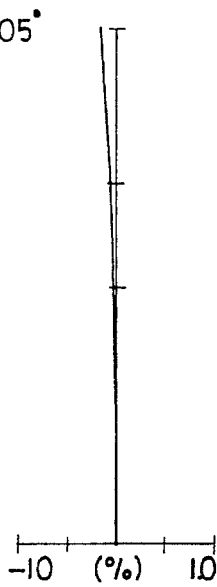
Figure 17A:
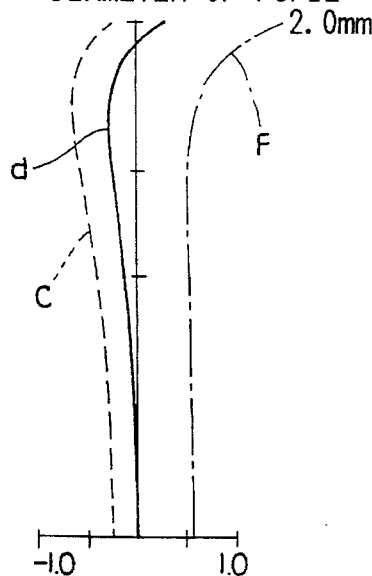
FIG. 17A, FIG. 17B and FIG. 17C show curves visualizing aberration characteristics at the tele position of the first embodiment of the present invention when it is set in the panoramic photographing mode.
Figure 17B:
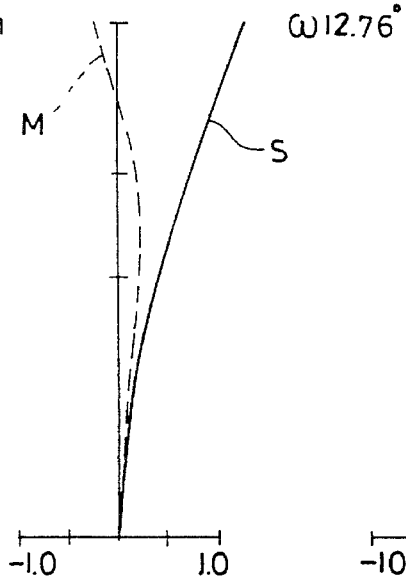
Figure 17C:
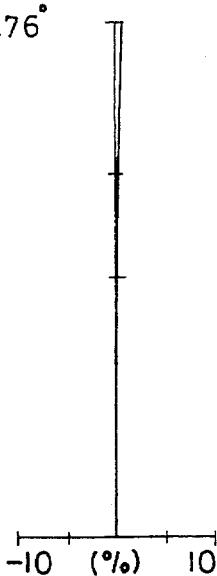
Figure 18A:
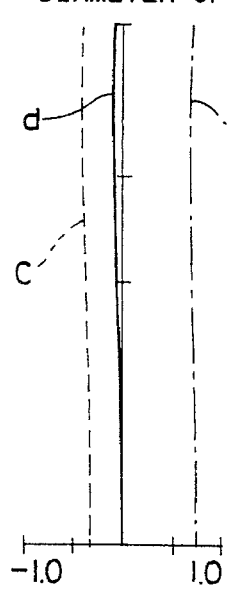
FIG. 18A, FIG. 18B and FIG. 18C show graphs illustrating aberration characteristics at the wide position of the second embodiment of the present invention when it is set in the ordinary photographing mode.
Figure 18B:
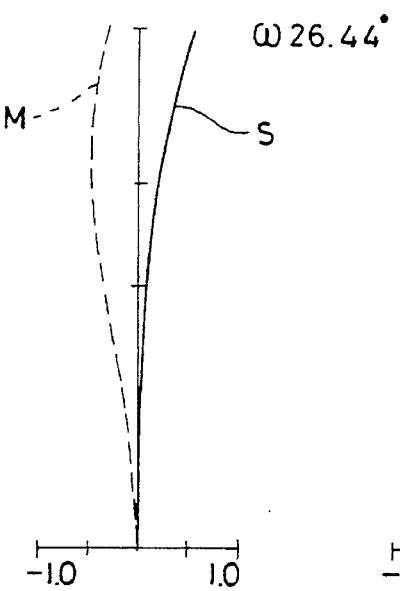
Figure 18C:
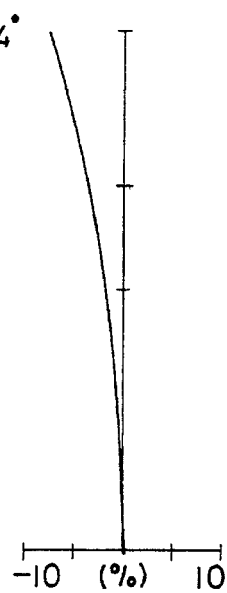
Figure 19A:
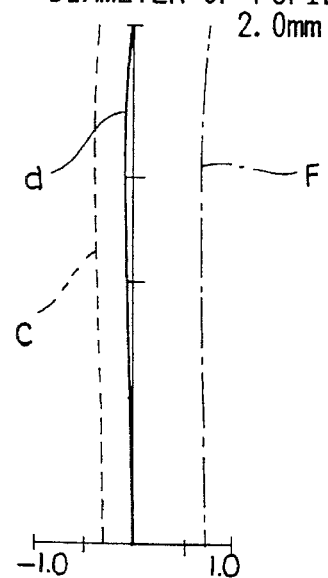
FIG. 19A, FIG. 19B and FIG. 19C show graphs illustrating aberration characteristics at the intermediate focal length of the second embodiment of the present invention when it is set in the ordinary photographing mode.
Figure 19B:
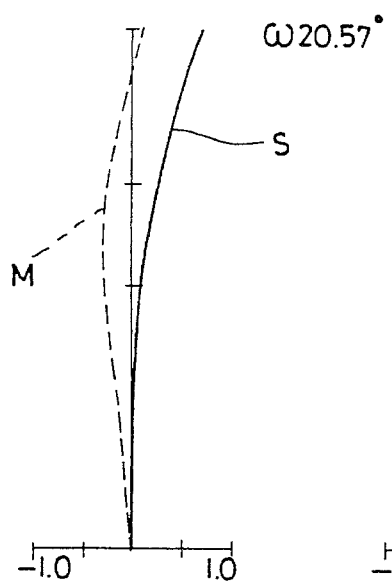
Figure 19C:
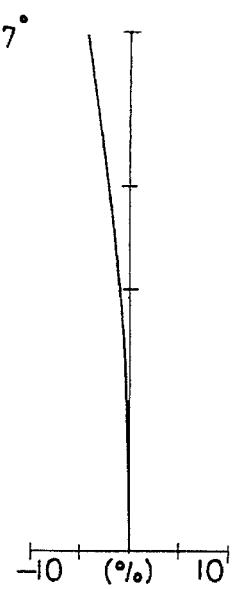
Figure 20A:
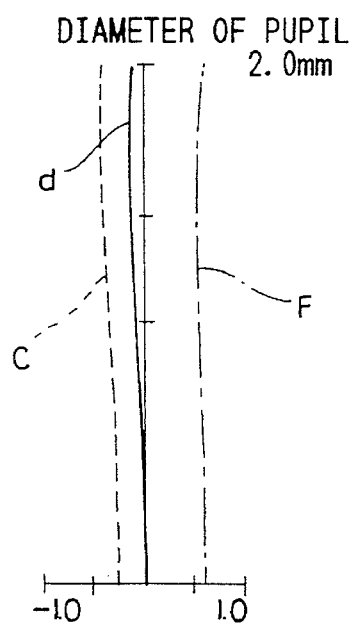
FIG. 20A, FIG. 20B and FIG. 20C show graphs illustrating aberration characteristics at the tele position of the second embodiment of the present invention when it is set in the ordinary photographing mode.
Figure 20B:
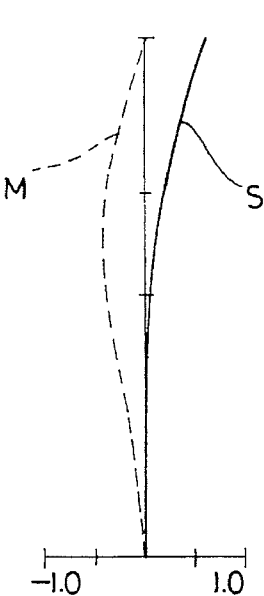
Figure 20C:
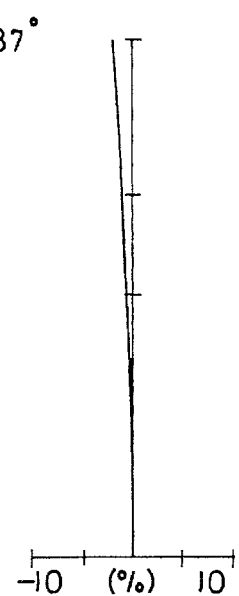
Figure 21A:
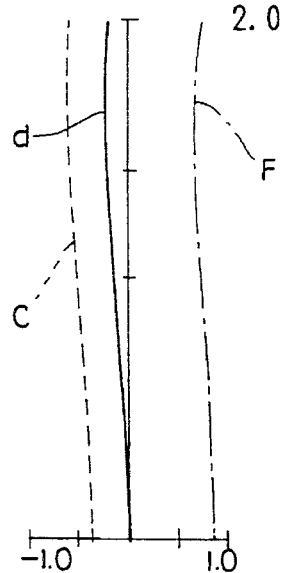
FIG. 21A, FIG. 21B and FIG. 21C show graphs illustrating aberration characteristics at the wide position of the second embodiment of the present invention when it is set in the panoramic photographing mode.
Figure 21B:
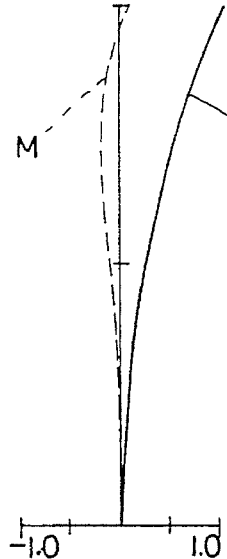
Figure 21C:
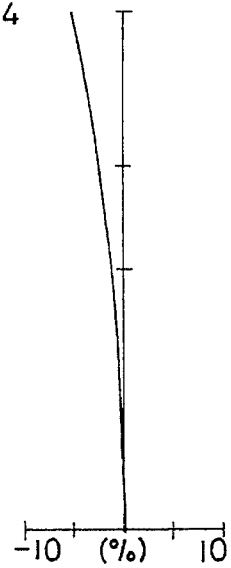
Figure 22A:
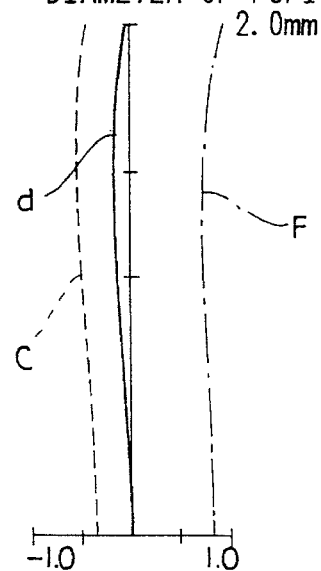
FIG. 22A, FIG. 22B and FIG. 22C show curves visualizing aberration characteristics at the intermediate focal length of the second embodiment of the present invention when it is set in the panoramic photographing mode.
Figure 22B:
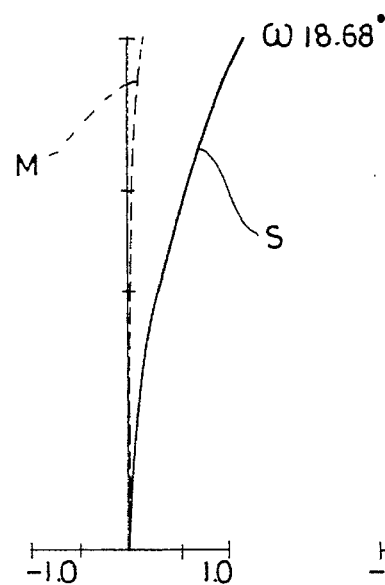
Figure 22C:
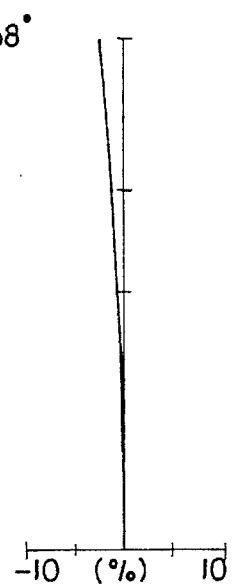
Figure 23A:
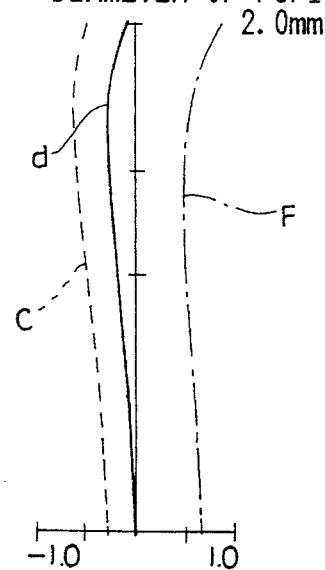
FIG. 23A, FIG. 23B and FIG. 23C show curves visualizing aberration characteristics at the tele position of the second embodiment of the present invention when it is set in the panoramic photographing mode.
Figure 23B:
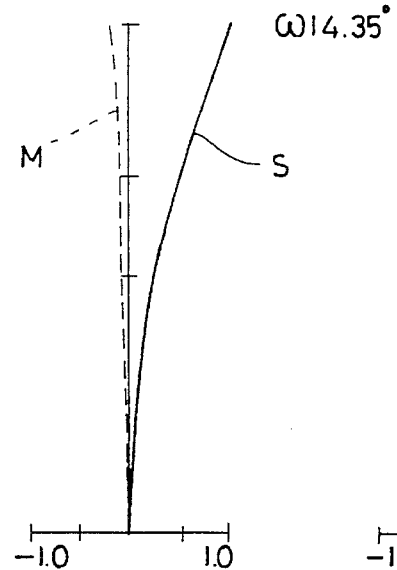
Figure 23C:
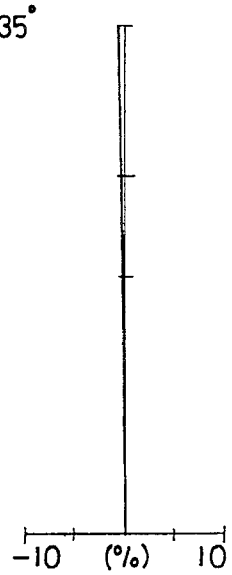

The third embodiment of the vari-focal viewfinder optical system according to the present invention has the composition illustrated in FIG. 10 and FIG. 11, wherein an objective lens system 1 comprises lens components $L_1$ and $L_2$, and has a fixed focal length. Further, the third embodiment of the present invention comprises image erecting members (reflecting members) 2 and 3 together with an eyepiece lens component 6, adopts a visual field frame 4 in the ordinary photographing mode shown in FIG. 10, or uses a visual field frame 5 and a positive lens component 7 which is set therein in the panoramic photographing mode visualized in FIG. 11. In other words, a surface r listed in the numerical data corresponds to the lens component 7 which is set in the vari-focal viewfinder optical system in the panoramic photographing mode thereof.

Figure 24A:
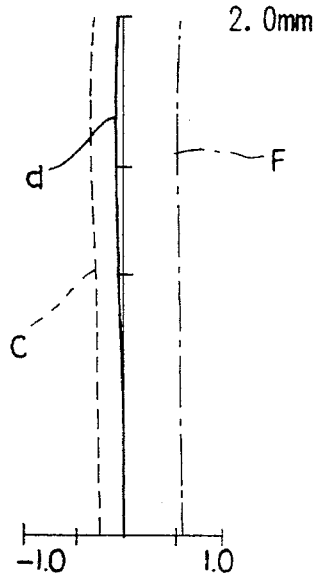
FIG. 24A, FIG. 24B and FIG. 24C show graphs visualizing aberration characteristics of the third embodiment of the present invention when it is set in the ordinary photographing mode.
Figure 24B:
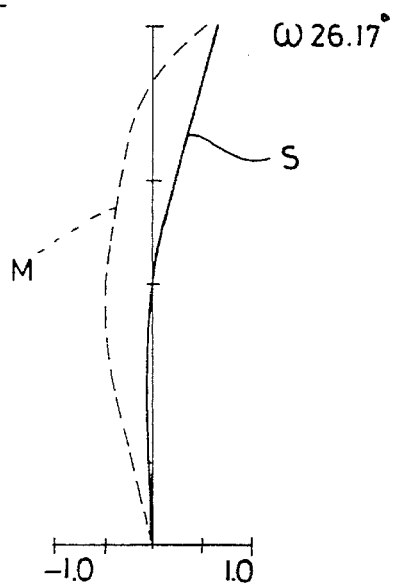
Figure 24C:
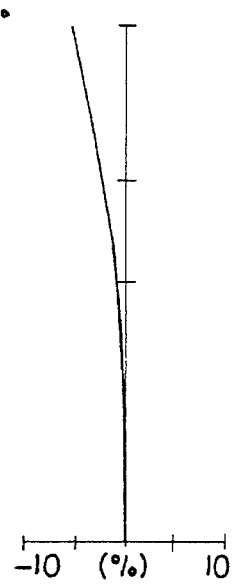
Figure 25A:
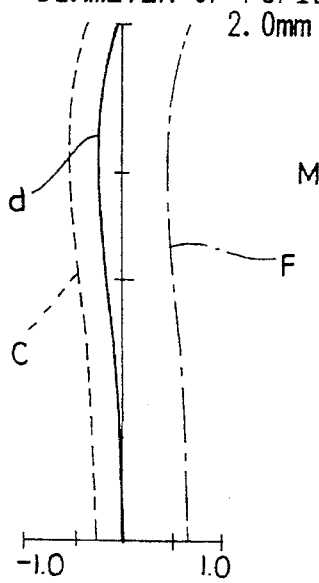
FIG. 25A, FIG. 25B and FIG. 25C show graphs visualizing aberration characteristics of the third embodiment of the present invention when it is set in the panoramic photographing mode.
Figure 25B:
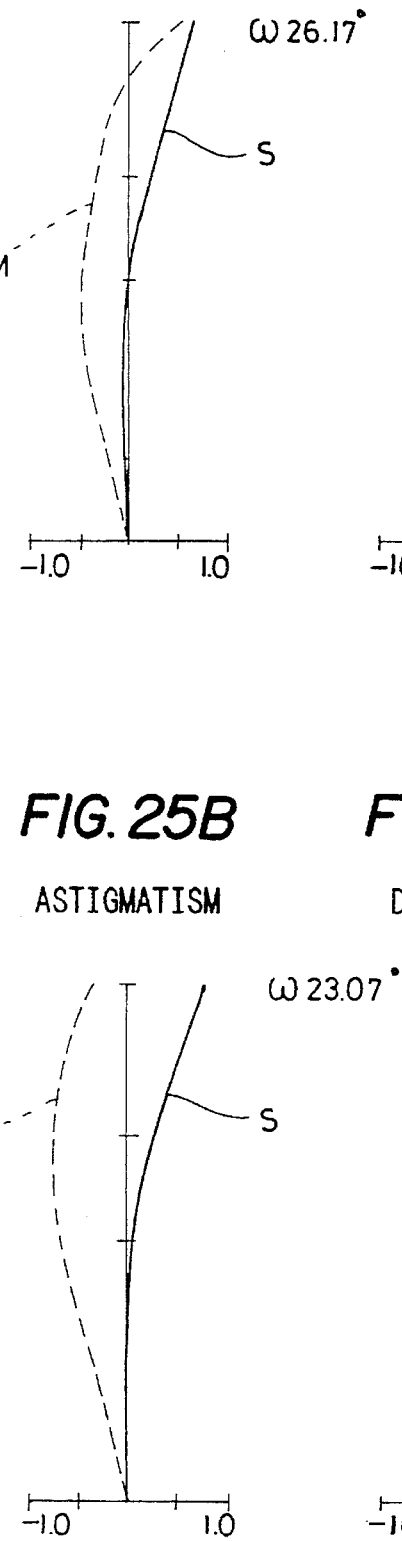
Figure 25C:
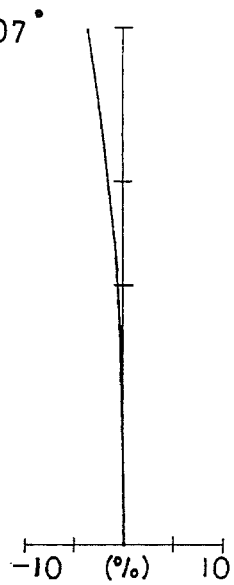

The third embodiment of the present invention is a vari-focal viewfinder optical system for use in combination with a photographic lens system having a fixed focal length, and adopts an objective lens system which is not configured as a vari-focal lens system. In the panoramic photographing mode of the third embodiment in which a horizontally elongated photographing range is adopted, the visual field frame 4 is exchanged with the visual field frame 5 or shielding plate which are disposed in the vicinity of a film surface are used for narrowing a vertical size of the visual field frame 4 so as to have an area nearly equal to that of the visual field frame 5. Further, a magnification of the vari-focal viewfinder optical system is enhanced so as to widen an observing visual field by interposing a lens component 7 in the viewfinder optical system in the panoramic photographing mode thereof. The third embodiment of the present invention has the aberration characteristics illustrated in FIGS. 24A–24C in the ordinary photographing mode thereof, whereas aberration characteristics in the panoramic photographing mode of the third embodiment are visualized in FIGS. 25A–25C.

In each of the embodiments of the present invention described above, an intermediate image surface is located between the reflecting members for shortening a total length of the vari-focal viewfinder optical system and favorably correcting aberration therein. In addition, the aspherical surfaces used in the embodiments of the present invention has shapes which are expressed by the formula shown below:

$$x = \frac{CS^2}{1 + \sqrt{1 - PC^2S^2}} + ES^4 + FS^6 + GS^8 + HS^{10}$$

wherein a direction of the optical axis is taken as x and a direction perpendicular to the optical axis is taken as s, the reference symbol C represents a radius of curvature (1/r) as measured at a vertex of the aspherical surface of interest, the reference symbol p designates a conical constant, and the reference symbols E, F, G and H denote aspherical surface coefficients.

In the numerical data of the embodiments of the vari-focal viewfinder optical system according to the present invention, values of r, d, n and v of the positive lens component which can be set and removed into and out of the optical path are different between the ordinary photographing mode and the panoramic photographing mode. Values of the aspherical surface coefficients and other items which are common to both the ordinary photographing mode and the panoramic photographing mode are specified for the ordinary photographing mode only and omitted for the panoramic photographing mode.

The vari-focal viewfinder optical system according to the present invention permits switching between the ordinary photographing mode and the panoramic photographing mode, is capable of accurately displaying photographing ranges in both the ordinary and panoramic photographing modes by switching visual field frames of the viewfinder optical system between the two photographing mode, allows to observe images with no strange impression by varying the focal length of the eyepiece lens component so as to change (enhance) the magnification of the viewfinder optical system with the positive lens component which can be set and removed into and out of the optical path between the reflecting members adopted as the image erecting optical system and the eyepiece lens component of the viewfinder optical system, has optical performance for favorably observing images with little variations of aberrations after the change of the magnification from those before the change of the magnification and with a small variation of diopter, and is advantageous for configuring cameras compact.

I claim:

1. A vari-focal viewfinder optical system comprising: an objective lens system for forming an image of an object to be photographed, reflecting members for erecting the image formed by said objective lens system, an eyepiece lens component for allowing observation of the image formed by said objective lens system and a lens component having a positive refractive power which is disposed so as to be settable and removable into and out of an optical path between said reflecting members and said eyepiece lens component; wherein an observing visual field of said varifocal viewfinder optical system is varied by changing a focal length of said eyepiece lens component by using said lens component having the positive refractive power which is settable and removable into and out of the optical path, and said eyepiece lens component is not moved for varying the focal length thereof.

2. A vari-focal viewfinder optical system comprising:

an objective lens system for forming an image of an object to be photographed, reflecting members for erecting the image formed by said objective lens system, an eyepiece lens component for allowing observation of the image formed by said objective lens system, and a lens component having a positive refractive power that is disposed so as to be settable and removable into and out of an optical path between said reflecting members and said eyepiece lens component, wherein an observing visual field of said vari-focal viewfinder optical system is varied by changing a focal length of said eyepiece lens component by using said lens component having the positive refractive power that is settable and removable into and out of said optical path, wherein said eyepiece lens component is not moved for varying the focal length of the vari-focal viewfinder optical system, and wherein said lens component having the positive refractive power satisfies the following condition (1):

$$1 < \left| \frac{(R_f - R_r)}{(R_f + R_r)} \right| < 5 \quad (1)$$

wherein the reference symbols $R_f$ and $R_r$ represent radii of curvature on an object side surface and an image side surface respectively of the lens component having the positive refractive power.

3. A vari-focal viewfinder optical system comprising:

an objective lens system for forming an image of an object to be photographed, reflecting members for erecting the image formed by said objective lens system, an eyepiece lens component for allowing observation of the image formed by said objective lens system and a lens component having a positive refractive power which is disposed so as to be settable and removable into and out of an optical path between said reflecting members and said eyepiece lens component; wherein an observing visual field of said vari-focal viewfinder optical system is varied by changing a focal length of said eyepiece lens component by using said lens component having the positive refractive power which is settable and removable into and out of the optical path.

* * * * *